US009909457B2

(12) United States Patent
DaCunha et al.

(10) Patent No.: US 9,909,457 B2
(45) Date of Patent: Mar. 6, 2018

(54) METHOD OF ASSEMBLING GAS TURBINE ENGINE SECTION

(71) Applicant: United Technologies Corporation, Hartford, CT (US)

(72) Inventors: Nelson DaCunha, Avon, CT (US); Jesse R. Christophel, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 55 days.

(21) Appl. No.: 15/059,805

(22) Filed: Mar. 3, 2016

(65) Prior Publication Data
US 2016/0215653 A1 Jul. 28, 2016

Related U.S. Application Data

(63) Continuation of application No. 14/607,301, filed on Jan. 28, 2015, now Pat. No. 9,333,603.

(51) Int. Cl.
F01D 25/24 (2006.01)
F01D 9/04 (2006.01)
(Continued)

(52) U.S. Cl.
CPC ............ F01D 25/246 (2013.01); B23K 31/02 (2013.01); F01D 5/06 (2013.01); F01D 5/063 (2013.01);
(Continued)

(58) Field of Classification Search
CPC ........... Y10T 29/4932; Y10T 29/49321; Y10T 29/49323; Y10T 29/49893;
(Continued)

(56) References Cited

U.S. PATENT DOCUMENTS 3,287,906 A 11/1966 McCormick
3,355,890 A 12/1967 Kappus
(Continued)

FOREIGN PATENT DOCUMENTS

EP 0503697 9/1992
EP 2199568 6/2010
(Continued)

OTHER PUBLICATIONS

Conference on Engineering and Physics: Synergy for Success 2006. Journal of Physics: Conference Series vol. 105. London, UK. Oct. 5, 2006.
(Continued)

Primary Examiner — Jason L Vaughan
(74) Attorney, Agent, or Firm — Carlson, Gaskey & Olds, P.C.

(57) ABSTRACT

A method for assembling a section of a gas turbine engine is disclosed. The method involves aligning a vane ring with a first rotor hub such that a row of vanes on the vane ring is adjacent a first row of blades of the first rotor hub, and aligning a second rotor hub with the vane ring such that a second row of blades of the second rotor hub is adjacent the row of vanes and the row of vanes is axially between the first row of blades and the second row of blades. The first hub and the second hub are then non-mechanically bonded together.

7 Claims, 7 Drawing Sheets

(51) Int. Cl.
*F01D 17/16* (2006.01)
*F02C 9/22* (2006.01)
*F01D 5/06* (2006.01)
*B23K 31/02* (2006.01)
*F01D 17/14* (2006.01)

(52) U.S. Cl.
CPC ............... *F01D 9/04* (2013.01); *F01D 9/041* (2013.01); *F01D 9/042* (2013.01); *F01D 17/14* (2013.01); *F01D 17/16* (2013.01); *F01D 17/162* (2013.01); *F02C 9/22* (2013.01); *F05D 2220/32* (2013.01); *F05D 2230/232* (2013.01); *F05D 2230/60* (2013.01); *Y10T 29/49321* (2015.01); *Y10T 29/49895* (2015.01); *Y10T 29/49904* (2015.01); *Y10T 29/49963* (2015.01)

(58) Field of Classification Search
CPC ........... Y10T 29/49904; F05D 2230/60; F05D 2240/10; F05D 2240/12; F01D 9/04; F01D 9/042; F01D 5/3007; F01D 5/3015; F01D 5/3069; B23P 19/042
See application file for complete search history.

(56) References Cited

U.S. PATENT DOCUMENTS

| | | |
|---|---|---|
| 3,754,484 A | 8/1973 | Roberts |
| 3,887,976 A * | 6/1975 | Sheilds ............... B23P 11/02 29/446 |
| 3,892,358 A | 7/1975 | Gisslen |
| 4,010,608 A | 3/1977 | Simmons |
| 4,130,872 A | 12/1978 | Harloff |
| 4,684,325 A * | 8/1987 | Arnold ............... F01D 5/3038 29/889.21 |
| 4,706,354 A | 11/1987 | Naudet |
| 4,790,133 A | 12/1988 | Stuart |
| 5,035,573 A | 7/1991 | Tseng et al. |
| 5,127,797 A | 7/1992 | Carman |
| 5,203,162 A | 4/1993 | Burge |
| 5,433,674 A | 7/1995 | Sheridan et al. |
| 5,447,411 A | 9/1995 | Curley et al. |
| 5,524,847 A | 6/1996 | Brodell et al. |
| 5,564,897 A | 10/1996 | Mansson |
| 5,569,018 A | 12/1996 | Mannava et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 6,223,616 B1 | 5/2001 | Sheridan |
| 6,318,070 B1 | 11/2001 | Rey et al. |
| 6,814,541 B2 | 11/2004 | Evans et al. |
| 7,021,042 B2 | 4/2006 | Law |
| 7,048,504 B2 | 5/2006 | Bailleul et al. |
| 7,185,484 B2 | 3/2007 | Griffin, III et al. |
| 7,591,754 B2 | 9/2009 | Duong et al. |
| 7,651,319 B2 | 1/2010 | Anderson et al. |
| 7,726,938 B2 * | 6/2010 | Blatchford ............ B23P 15/006 29/889.22 |
| 7,824,305 B2 | 11/2010 | Duong et al. |
| 7,914,255 B2 * | 3/2011 | Workman ............... F01D 9/042 29/889.22 |
| 7,926,260 B2 | 4/2011 | Sheridan et al. |
| 8,007,229 B2 * | 8/2011 | McCaffrey ............ F01D 9/041 29/889.22 |
| 8,092,165 B2 * | 1/2012 | Bouchard ............... F01D 9/02 29/889.22 |
| 8,205,432 B2 | 6/2012 | Sheridan |
| 8,511,982 B2 | 8/2013 | Hart et al. |
| 8,695,920 B2 | 4/2014 | Suciu et al. |
| 2010/0129211 A1 | 5/2010 | Hart et al. |
| 2010/0148396 A1 | 6/2010 | Xie et al. |
| 2010/0331139 A1 | 12/2010 | McCune |
| 2011/0223013 A1 | 9/2011 | Wlasowski |
| 2012/0308381 A1 | 12/2012 | Suciu et al. |
| 2013/0223984 A1 * | 8/2013 | Gehlot ............... F04D 19/024 415/68 |
| 2014/0157757 A1 | 6/2014 | Hasel et al. |
| 2014/0174056 A1 | 6/2014 | Suciu et al. |

FOREIGN PATENT DOCUMENTS

| | | |
|---|---|---|
| GB | 1516041 | 6/1978 |
| GB | 2041090 | 9/1980 |
| WO | 2007038674 | 4/2007 |

OTHER PUBLICATIONS

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

(56) References Cited

OTHER PUBLICATIONS

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

Gunston, B. (Ed.) (2000). Jane's aero-engines, Issue seven. Coulsdon, Surrey, UK: Jane's Information Group Limited.

Ivchenko—Progress D-436. Jane's Aero-engines, Aero-engines—Turbofan. Feb. 8, 2012.

Ivchenko—Progress AI-727M. Jane's Aero-engines, Aero-engines—Turbofan. Nov. 27, 2011.

Ivchenko—Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8), p. 32.

Hendricks, E.S. and Tong, M.T. (2012). Performance and weight estimates for an advanced open rotor engine. NASA/TM-2012-217710.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.

Zalud, T. (1998). Gears put a new spin on turbofan performance. Machine Design, 70(20), p. 104.

European Search Report for European Patent Application No. 16152936 completed Jun. 22, 2016.

Leap Turbofan Engine Product Brochure. Retrieved from http://www.cfmaeroengines.com/engines/leap on Jan. 7, 2015.

\* cited by examiner

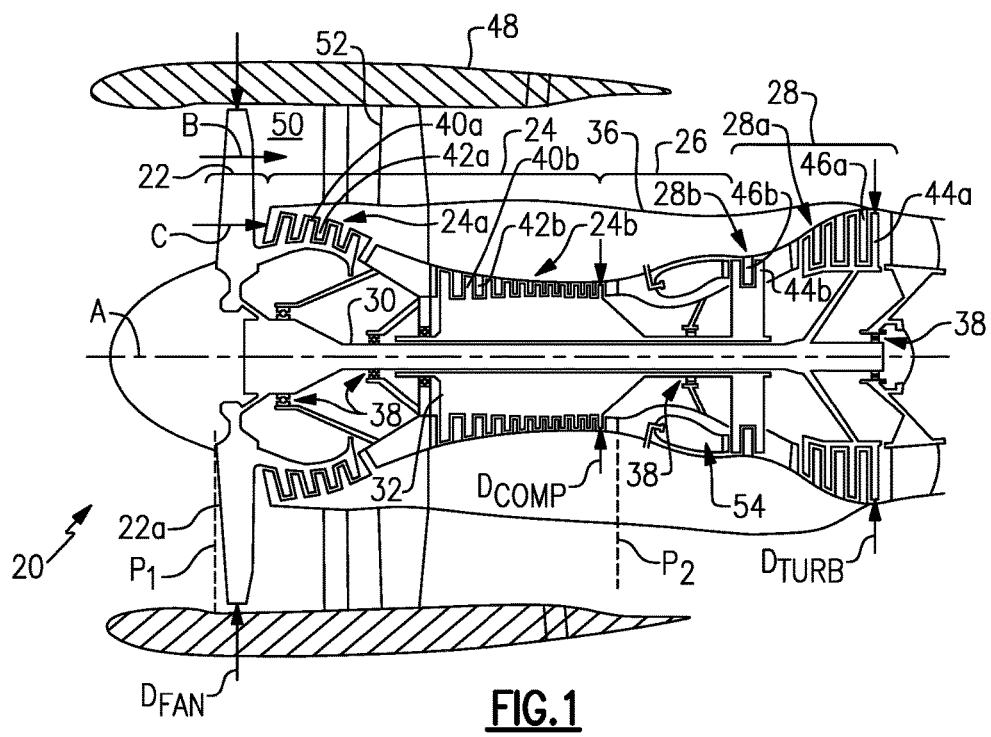
FIG.1
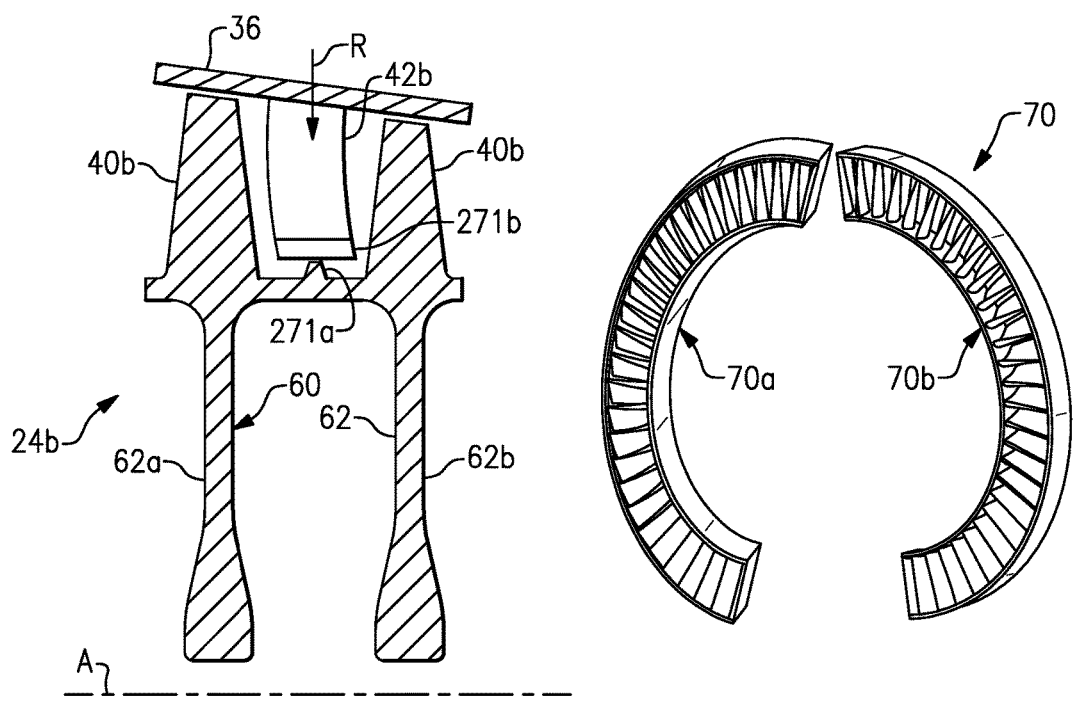
FIG.2
FIG.3

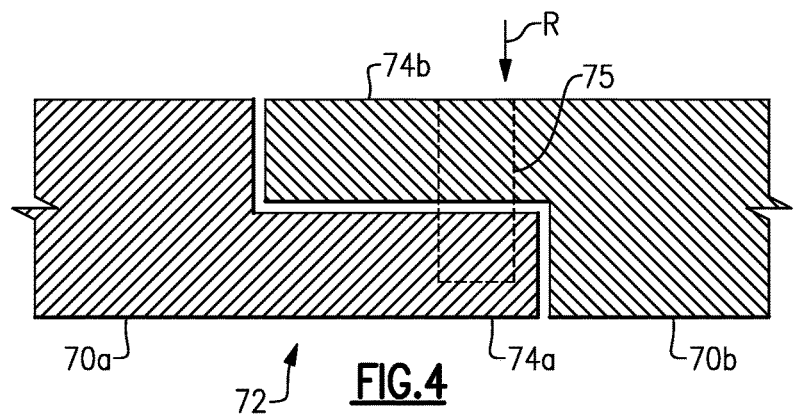
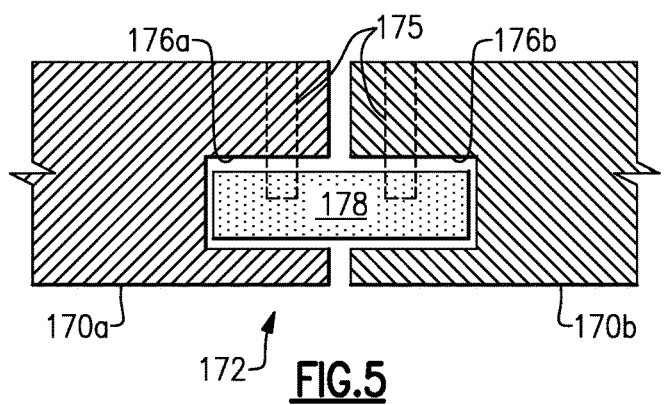
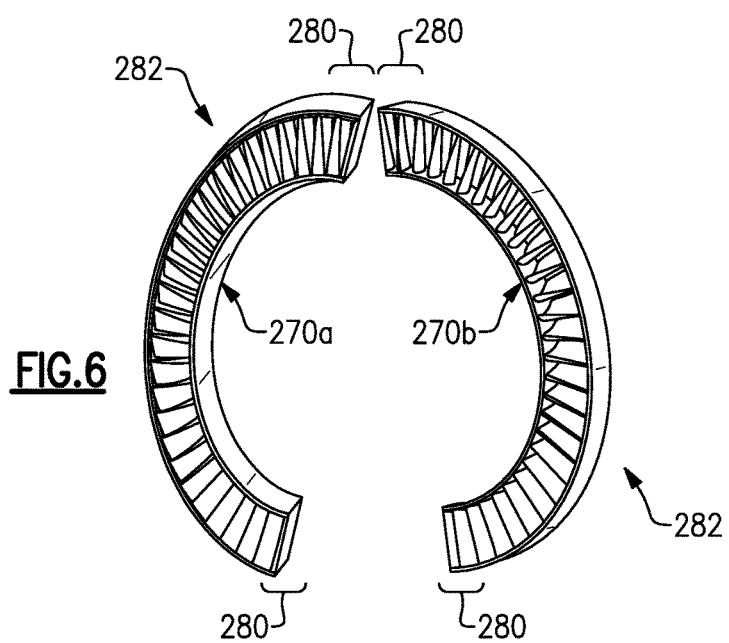

METHOD OF ASSEMBLING GAS TURBINE ENGINE SECTION

CROSS-REFERENCE TO RELATED APPLICATION

The present disclosure is a continuation of U.S. patent application Ser. No. 14/607,301, filed Jan. 28, 2015.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through a high spool, and the low pressure turbine drives the low pressure compressor through a low spool. The fan section may also be driven by the low spool. A direct-drive gas turbine engine includes a fan section driven by the low spool, without a gear mechanism, such that the low pressure compressor, low pressure turbine and fan section rotate at a common speed.

SUMMARY

A method for assembling a section of a gas turbine engine according to an example of the present disclosure includes aligning a vane ring with a first rotor hub such that a row of vanes on the vane ring is adjacent a first row of blades of the first rotor hub, aligning a second rotor hub with the vane ring such that a second row of blades of the second rotor hub is adjacent the row of vanes and the row of vanes is axially between the first row of blades and the second row of blades, and non-mechanically bonding the first hub and the second hub together.

In a further embodiment of any of the foregoing embodiments, non-mechanically bonding the first hub and the second hub together includes metallurgically bonding the first hub and the second hub.

A method for assembling a section of a gas turbine engine according to an example of the present disclosure includes aligning variable vanes on a vane ring with a corresponding one of a plurality of throat regions of an end row of blades of a multi-row rotor drum and moving the vane ring such that the variable vanes move through the plurality of throat regions past the end row into a position axially between the end row and a next row of blades of the multi-row rotor drum.

In a further embodiment of any of the foregoing embodiments, the multi-row rotor drum is formed of a single-piece body that has a plurality of rows of blades.

In a further embodiment of any of the foregoing embodiments, the aligning includes adjusting the variable vanes in unison.

In a further embodiment of any of the foregoing embodiments, the aligning includes adjusting the variable vanes individually.

In a further embodiment of any of the foregoing embodiments, the aligning includes adjusting the variable vanes using an assembly tool.

In a further embodiment of any of the foregoing embodiments, moving the vane ring axially and circumferentially to navigate the variable vanes through the throat regions free of contact with the blades of the end row.

A further embodiment of any of the foregoing embodiments includes pivoting the variable vanes to navigate the variable vanes through the throat regions free of contact with the blades of the end row.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example gas turbine engine that has a direct-drive engine architecture.

FIG. 2 illustrates an example multi-row rotor drum of a low compressor section.

FIG. 3 illustrates an example split vane assembly.

FIG. 4 illustrates an example overlapping joint of a split vane assembly.

FIG. 5 illustrates an example sealed joint of a split vanes assembly.

FIG. 6 illustrates an example split vane assembly with arc segments that have end portions that are stronger than intermediate portions of the arc segments.

DETAILED DESCRIPTION

Figure 7:
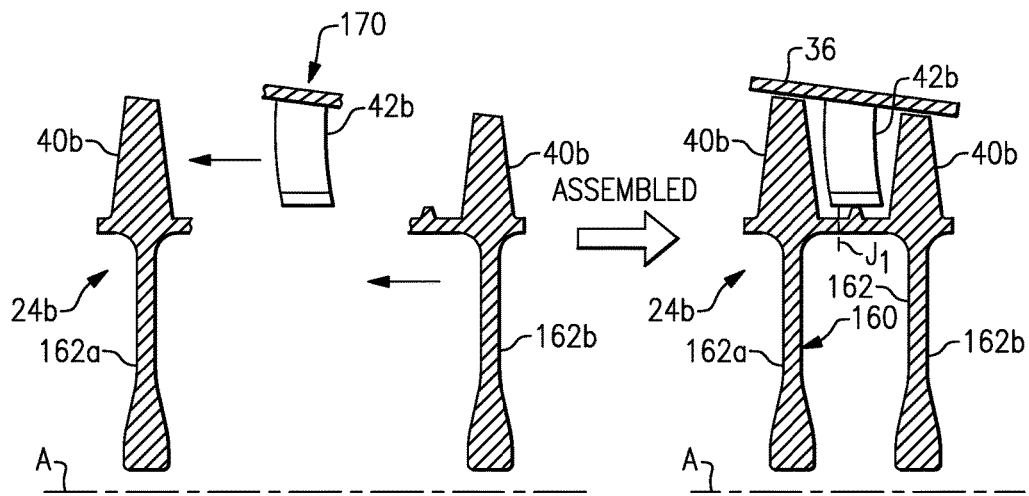
FIG. 7 illustrates an example multi-row rotor drum that is assembled from two hub sections that are bonded together.

FIG. 1 schematically illustrates a gas turbine engine 20 ("engine 20"). The engine 20 has a direct-drive engine architecture. Unlike a geared engine architecture that drives the fan through a gear mechanism to change the rotational speed of the fan relative to the driving portion of the turbine, a direct-drive engine architecture drives the fan without such a gear mechanism such that the fan rotates at the same speed as the driving portion of the turbine.

The engine 20 is a two-spool arrangement that generally includes a fan section 22, a compressor section 24, a combustor section 26, and a turbine section 28. In this example, these sections are arranged serially along engine central axis A with respect to flow through the engine 20, although the examples herein may also be applicable to reverse-flow arrangements and other multi-spool arrangements, such as three-spool arrangements.

The engine 20 includes a first (or low) spool 30 and a second (or high) spool 32 mounted on bearing systems 38 for concentric rotation about the engine central axis A relative to an engine static structure 36. Although the bearing systems 38 are shown at various locations, these locations can vary as appropriate to the engine design, and fewer or additional bearing systems 38 may be provided. The first spool 30 may be referred to as a low speed spool and the second spool 32 may be referred to as a high speed spool, relative to the speed of the low speed spool.

The compressor section 24 includes a low compressor section 24a and a high compressor section 24b, and the turbine section 28 includes a low turbine section 28a and a high turbine section 28b. The low compressor section 24a may also be referred to as a low pressure compressor and the high compressor section 24b may be referred to as a high pressure compressor, relative to pressure in the low pressure compressor. Likewise, the low turbine section 28a may also be referred to as a low pressure turbine and the high turbine section 28b may be referred to as a high pressure turbine, relative to pressure in the low pressure turbine.

The low compressor section 24a and the high compressor section 24b include, respectively, rows of rotatable compressor blades 40a and 40b that are interleaved with rows of static compressor vanes 42a and 42b. A row of compressor vanes and an adjacent row of compressor blades are a compressor stage.

The low turbine section 28a and the high turbine section 28b include, respectively, rows of rotatable turbine blades 44a and 44b that are interleaved with rows of static turbine vanes 46a and 46b. A row of turbine vanes and an adjacent row of turbine blades are a turbine stage. In this example, the low turbine section 28a has four stages. In other examples, the low turbine section 28a may have three or fewer stages. In other examples, the low turbine section 28a may have more than four stages such as, for example, five, six, or seven stages.

The fan section 22 includes at least one row of fan blades 22a. A case 48 extends around the fan section 22 and bounds an outer periphery of a bypass passage 50. The fan blades 22a are located generally at the inlet of the bypass passage 50. One or more rows of guide vanes 52 can be provided downstream from the fan blades 22a. The guide vanes 52 extend between the case 48 and the static structure 36.

The combustion section 26 includes a combustor 54. In this example, the combustor 54 is arranged axially between the high compressor section 24b and the high turbine section 28b.

The first spool 30 directly couples the low turbine section 28a with the low compressor section 24a and the fan section 22. The second spool 32 couples the high turbine section 28b with the high compressor section 24b. Since there is no gear mechanism in the interconnection between the low turbine section 28a and the fan section 22, the engine 20 is a direct-drive engine architecture, and the fan section 22 will rotate at the same rotational speed as the low turbine section 28a.

The compressor section 24, the combustor section 26, and the turbine section 28 form a core engine, which drives the fan section 22. The compressor section 24 drives core air C along a core flow path through the low compressor section 24a and then the high compressor section 24b. Compressed air from the high compressor section 24b is mixed with fuel and burned in the combustor 54 to generate an exhaust gas stream. The exhaust gas stream is expanded through the high turbine section 28b and then the low turbine section 28a. The expansion over the high turbine section 28b rotationally drives the second spool 32 to thus drive the high compressor section 24b. The expansion over the low turbine section 28a rotationally drives the first spool 30 to thus drive the low compressor section 24a and the fan section 22. The rotation of the fan section 22 drives bypass air B through the bypass passage 50 (to provide a significant amount of the thrust of the engine 20) and core air C to the low compressor section 42a.

One characteristic of a turbofan engine is the bypass ratio of the turbofan engine. The bypass ratio is the ratio of the amount of air that passes through the bypass passage 50 as bypass air B to the amount of air that passes through the core engine as core air C at a given performance point. Typically a direct drive turbofan engine will not be able to exceed a bypass ratio of about 8 due to engine performance limitations. However, according to an embodiment, the core engine includes a bypass ratio of 8.5-11 even without a gear and with an engine has a thrust rating equal to or less than 40,000 pounds. In one further embodiment, the thrust rating is from 30,000 pounds to 40,000 pounds, and the overall pressure ratio ("OPR") is approximately 40 to approximately 50. The OPR is the ratio of stagnation pressure at the inlet of the fan section 22, such as at $P_1$ in FIG. 1, to the stagnation pressure at the outlet of the high compressor section 24b, such as at $P_2$ in FIG. 1. The performance point for determining the overall pressure ratios herein is the flight condition at the top of climb prior to leveling off for cruise flight condition. The performance point for determining the bypass ratios herein is a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of mass of fuel being burned divided by force of thrust the engine produces at that minimum point.

In a further example, the fan section 22 (at the root of the fan blades 22a), the low compressor section 24a and the high compressor section 24b together have an OPR of approximately 40 to approximately 60 In a further embodiment, enhanced performance can be achieved by including a first row of turbine blades 46b of the high turbine section 28b that has an operating temperature of approximately 2700° F. to approximately 3000° F. (approximately 1482° C. to approximately 1649° C.) at maximum takeoff thrust, and with an engine that has a thrust rating equal to or less than 40,000 pounds. In one further embodiment, the thrust rating is from 30,000 pounds to 40,000 pounds, and the OPR is approximately 40 to approximately 50. In another example embodiment, the bypass ratio is greater than 4 and the OPR is greater than 40, and in one additional example embodiment the bypass ratio is 8.5-11 and the OPR is greater than 55.

In a further example, the row of blades 22a of the fan section 22 have a fan diameter, $D_{fan}$, the high compressor section 24b has a final compressor blade row prior to the combustor section 26 that has a compressor diameter, $D_{comp}$, and the stages of the low turbine section 28a have a maximum diameter, $D_{turb}$. The fan diameter, the compressor diameter, and the maximum diameter of the low turbine section 28a have an interdependence represented by a scalable ratio $D_{fan}/D_{comp}$ from 3.5 to 5.0 and a scalable ratio $D_{fan}/D_{turb}$ from 1.4 to 1.8, and the fan diameter is at least 68 inches. The interdependence is such that the value of any one of the fan diameter, the compressor diameter, and the maximum diameter depends on the values of the other two through the above ratios.

FIG. 2 illustrates selected portions of a further example of the high compressor section 24b. In this example, the high compressor section 24b includes a multi-row integrally bladed rotor drum 60 that is formed of a single-piece body 62. In one example, instead of bonded joints or mechanical joints that are used to secure several hub pieces together, the single-piece body 62 includes no joints. For instance, the single-piece body 62 is a single, continuous piece of material. In other examples, the multi-row integrally bladed rotor drum 60 includes one or more bonded joints that serve solely, or at least primarily, to hold the multi-row integrally bladed rotor drum 60 together as a unit. In this case, the multi-row integrally bladed rotor drum 60 may include one or more mechanical joints that supplement the one or more bonded joints. A bonded joint may be a joint that is secured by an adhesive, by pressure, by heat, or a combination thereof, such that there is a distinct boundary or discontinuity between the bonded portions that is at least microscopically discernible. Weld and braze joints are examples of bonded, metallurgical joints.

The multi-row integrally bladed rotor drum 60 presents a challenge to assembly of the high compressor section 24b. With single rotors, a continuous hoop vane assembly can be assembled axially between rotors. However, the single-piece body 62 may not permit this assembly approach because the blades would interfere with the vanes of the vane assembly during installation; therefore, a different assembly methodology that meets this challenge is needed. It is to be understood that the examples herein are also applicable to a turbine section that includes a multi-row rotor drum. Further, assembly can include assembling sections of the high compressor section 24b into the engine 20 to form the high compressor section 24b in the engine 20, or assembling the sections to separately form the high compressor section 24b and then assembling the high compressor section 24b into the engine 20.

In one example, the compressor vanes 42b that are axially between the rows of the compressor blades 40b of the multi-row integrally bladed rotor drum 60 are in a split vane assembly 70, shown in FIG. 3. The split vane assembly 70 includes two 180° arc segments 70a and 70b. The arc segments 70a/70b can each be inserted in a radial direction (see "R" FIG. 2) into an assembled position between the rows of the compressor blades 40b to provide the row of compressor vanes 42b. In one modified example, the arc segments 70a and 70b have unequal arc lengths. In another example, rather than two arc segments, the vane assembly 70 could have three or more arc segments, which may have equal or unequal arc lengths, or a combination thereof.

Once in the assembled position, the circumferential ends of the arc segments 70a/70b meet at joints or interfaces. These joints or interfaces could be locations of weakness and/or locations at which core air could escape. FIG. 4 illustrates an example overlapping joint 72. In this example, the arc segments 70a/70b include, respectively, tabs 74a/74b that overlap with respect to the radial direction R. The overlapping joint 72 can serve any or all of several functions, including but not limited to, facilitating alignment of the arc segments 70a/70b, locking the arc segments 70a/70b, and providing labyrinth sealing at the interface. Optionally, one or more alignment pins 75 can also be used to facilitate axial alignment.

FIG. 5 illustrates another example joint 172. In this disclosure, like reference numerals designate like elements where appropriate and reference numerals with the addition of one-hundred or multiples thereof designate modified elements that are understood to incorporate the same features and benefits of the corresponding elements. In this example, the arc segments 170a/170b include, respectively, slots 176a/176b. The slots 170a/170b cooperatively retain a circumferential seal element 178 in the interface of the joint 172, to reduce the potential for the escape of core air. In further examples, at least portions of the interfaces can be non-mechanically bonded, such as by weld or braze, to provide sealing. Optionally, one or more alignment pins 175 can also be used to facilitate axial alignment.

FIG. 6 illustrates a further example in which arc segments 270a/270b include end portions 280 that are stronger than intermediate portions 282 of the arc segments 270a/270b. In one example, the end portions 280 are made stronger by adding mechanical features, such as increased thickness of vanes 42b in the end portions 280 relative to the other vanes in the arc segment 270a/270b or features in the end portions 280 that allow for structural bonding of the end portions 280 in addition to the arc segments, as described in FIGS. 4 and 5. In another example, the end portions 280 are made stronger by using a different, stronger material for the end portions than the intermediate portions 282. The stronger end portions 280 resist deflection of the full vane ring at the joints between the arc segments 270a/270b, which may reduce "ovalization" during operational loading.

FIG. 7 illustrates another example multi-row integrally bladed rotor drum 160 that has a single piece body 162. In this example, the single piece body 162 includes one or more bonded joints, such as at $J_1$. A bonded joint may be a joint that is secured by an adhesive, by pressure, by heat, or a combination thereof, such that there is a distinct boundary or discontinuity between the bonded portions that is at least microscopically discernible. For example, the single piece body 162 can include a first, forward hub 162a and a second, aft hub 162b that are bonded together at bonded joint $J_1$. Each hub 162a/162b includes a row of the compressor blades 40b which are bonded to or machined with each hub 162a/162b, with the row of compressor vanes 42b axially there between. Thus, the first hub 162a can be assembled, followed by axial assembly of a vane assembly, followed by assembly of the second hub 162b, which is then bonded in joint $J_1$ to the first hub 162a. In this regard, the bonded joint permits the use of an axial assembly approach.

As also shown in FIG. 7, the compressor vanes 42b can be assembled by moving a vane ring 170 with the compressor vanes 42b into alignment with the first hub 162a such that the row of vanes 42b is adjacent the first row of blades 40b. In a further embodiment, the vane ring 170 is a continuous full hoop. The second rotor hub 162b is then moved into alignment with the vane ring 170 such that the second row of blades 40b is adjacent the row of vanes 42b and the row of vanes 42b is axially between the first and second rows of blades 40b. The first hub 162a and the second hub 162b are then non-mechanically bonded at bonded joint $J_1$. In this regard, the bonded joint $J_1$ permits the use of an axial assembly approach.

Figure 8:
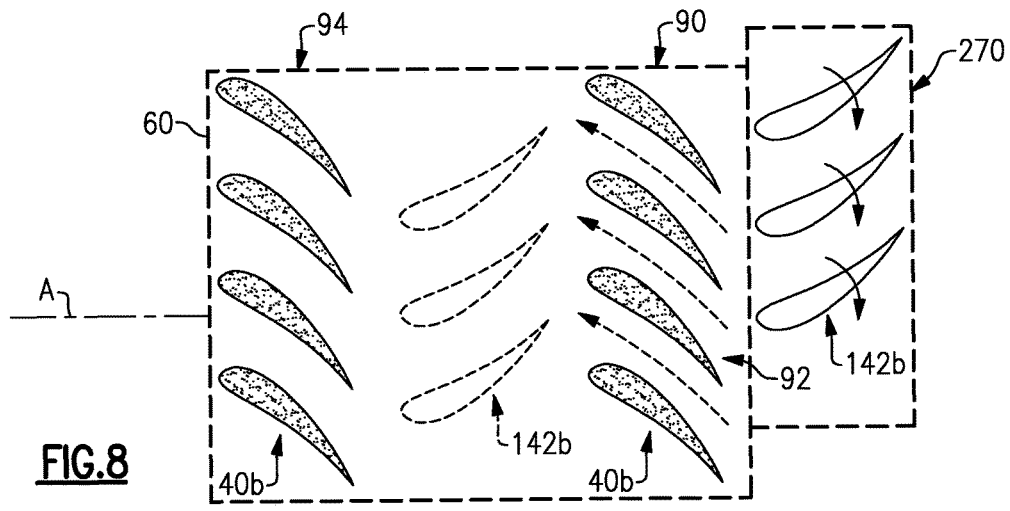
FIG. 8 illustrates an example of a vane ring that is assembled onto a multi-row rotor drum by sliding variable vanes through the throat regions between blades of an end row of the rotor.

FIG. 8 illustrates another example in which vanes 142b of vane ring 270 are variable vanes, to permit axial assembly of the vane ring 270 onto the multi-row integrally bladed rotor drum 60. As can be appreciated, only a few of the variable vanes 142b are shown, to demonstrate the assembly. It is to be understood that the vane ring 270 is a full hoop with the variable vanes 142b circumferentially-spaced there around. The variable vanes 142b can be pivoted about their individual radial axis. In some embodiments, the variable vanes 142b are interconnected with a common actuation mechanism such that the variable vanes 142b are moveable in unison. For instance, a unison ring can be provided to link the variable vanes 142b such that rotation of the unison ring causes each variable vane 142b to pivot about its own radial axis. In other embodiments, each variable vane 142b can be moved independently of the other variable vanes 142b. Further, the variable vanes 142b can be moved in an automated fashion using a powered actuator, or the variable vanes 142b can be moved manually or using a tool, such as a torque wrench or other device.

In this embodiment, the multi-row integrally bladed rotor drum 60 includes at its axial end an end row 90 of blades 40b. The blades 40b are circumferentially spaced-apart by respective throat regions 92. To assemble the vane ring 270 onto the multi-row integrally bladed rotor drum 60, each variable vane 142b is aligned with a corresponding throat region 92 of the end row 90. For instance, the chords or the variable vanes 142b are aligned relative to the throat regions 92. The vane ring 270 is then moved such that the variable vanes 142b move through the throat regions 92 past the end row 90 into an assembled position axially between the end row 90 and a next row (shown at 94) of blades 40b from the end row 90.

In further embodiments, the design of the variable vanes 142b and the multi-row integrally bladed rotor drum 60 can be adapted to permit the axial assembly of the variable vanes 142b past the blades 40b into the assembled position. For instance, vanes often seal against a portion of a rotor. In one example, the seal includes a knife edge 271a provided or formed on the multi-row integrally bladed rotor drum 60 (FIG. 2), and the variable vanes 142b include honeycombs 271b on radially inner diameters. Alternatively, the honeycomb could be on the rotor and the knife edges on the vanes. A radial clearance gap is provided between the knife edge 271a and the honeycomb 271b to permit the honeycombs 271b of the variable vanes 142b to move into axial alignment with the knife edges 271a (or alternatively the knife edges to move into axial alignment with the honeycomb). The clearance gap can be at least as large as dimensional and assembly tolerances to ensure that there is no interference during assembly.

Figure 9:
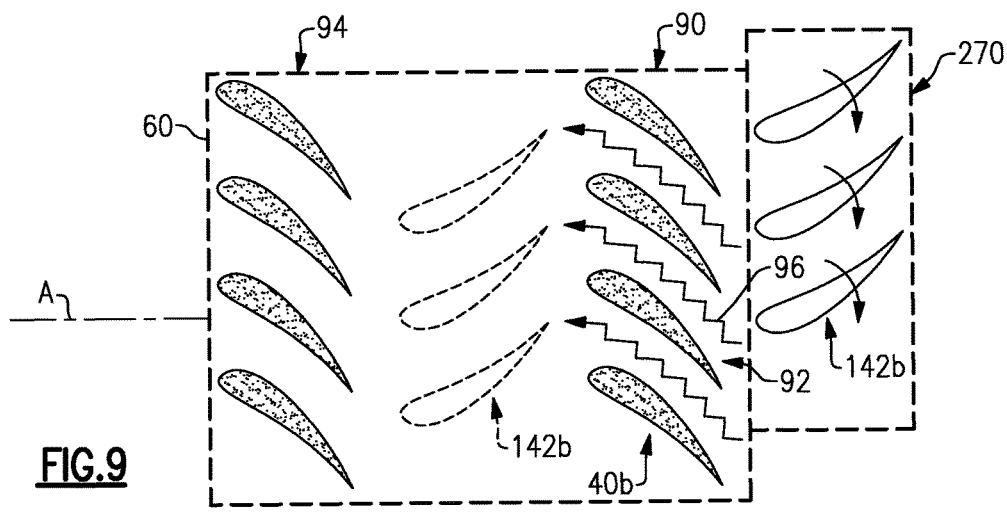
FIG. 9 illustrates an example of a vane ring that is assembled onto a multi-row rotor drum by sliding variable vanes axially and circumferentially.

In another embodiment shown in FIG. 9, the vane ring 270 is moved axially and circumferentially to navigate the variable vanes 142b through the throat regions 92, with no or little contact with the blades 40b. The axial and circumferential movement is represented at stepped lines 96.

Figure 10:
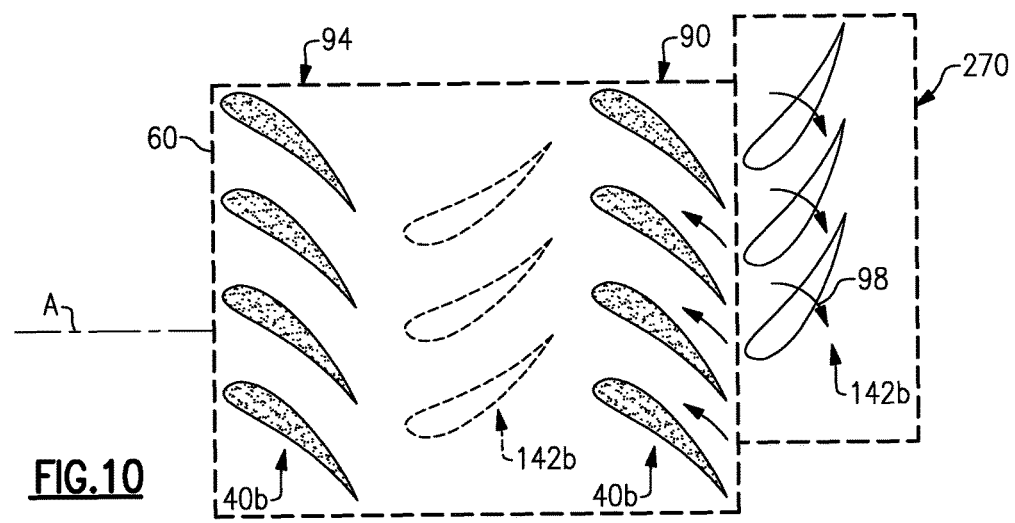
FIG. 10 illustrates an example of a vane ring that is assembled onto a multi-row rotor drum by pivoting variable vanes.

In another example shown in FIG. 10, the variable vanes 142b are pivoted about their radial axes to navigate through the throat regions 92 with no or little contact with the blades 40b. The pivoting movement is represented at lines 98. Of course, it is also contemplated that the variable vanes 142b be pivoted, in combination with also moving axially and circumferentially, to navigate through the throat regions 92.

Figure 11:
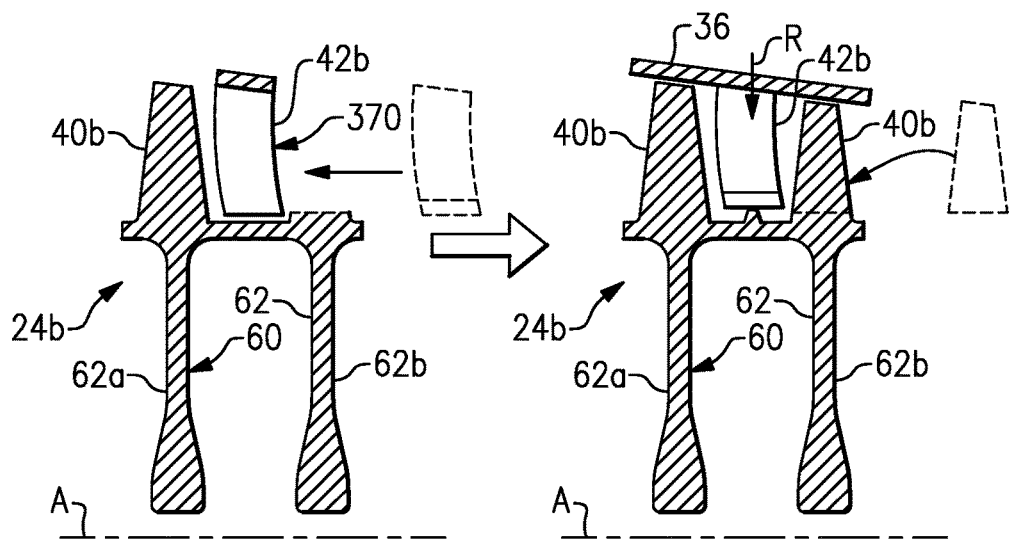
FIG. 11 illustrates an example vane ring that is assembled onto a multi-row integrally bladed rotor drum, where at least one row of blades is secured to, or fabricated in-situ on, the multi-row integrally bladed rotor drum.

In another example shown in FIG. 11, the blades 40b of at least one row of the multi-row integrally bladed rotor drum 60 are initially separate such that a full hoop vane ring 370 can be axially assembled over the multi-row integrally bladed rotor drum 60. The blades 40b of the second row are then secured to, or formed on, the multi-row integrally bladed rotor drum 60. In this regard, the blades 40b can be pre-fabricated and then secured or, alternatively, fabricated in-situ on the multi-row integrally bladed rotor drum 60 using an additive fabrication technique.

Figure 12:
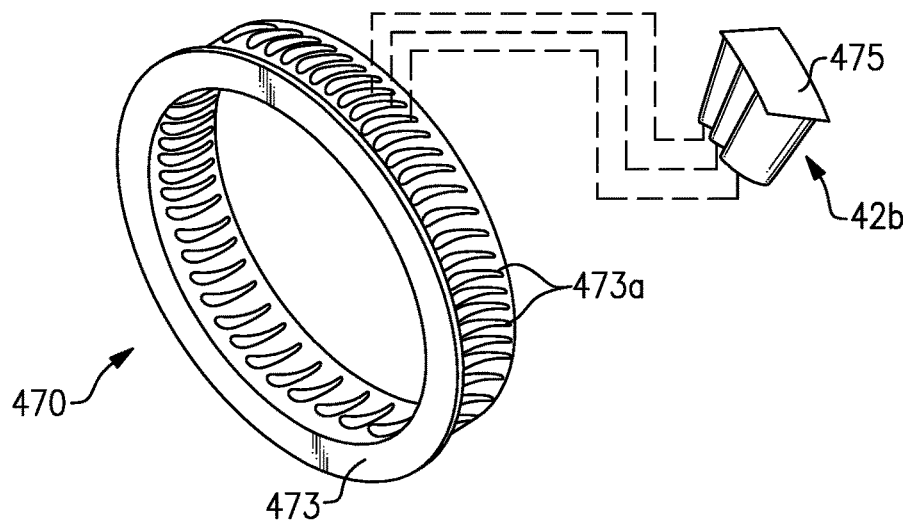
FIG. 12 illustrates an example continuous hoop vane ring.

FIG. 12 illustrates another example vane assembly 470 for installing the row of compressor vanes 42b axially between the rows of the compressor blades 40b of the multi-row integrally bladed rotor drum 60. In this example, the vane assembly 470 is a continuous full hoop that includes an annular support 473 with a plurality of vane openings 473a arranged around the circumference thereof. The annular support 473 can be positioned axially between the rows of rotor blades 40b, and the vanes 42b can then be inserted radially through the vane openings 473a. In this example, the vanes 42b are vane multiplets that have two or more airfoils that are attached to a common platform 475. Each multiplet is assembled into the annular support 470. Alternatively, the vanes 42b can be individual vanes that are assembled into the annular support 470 individually.

The vanes 42b are secured to the annular support 473 by mechanical fastener, bonded joint, or combination thereof. If mechanical, the mechanical joint can include a tab that extends from the vane 42b adjacent the annular support 473. The tab and annular support 473 can have an opening that receives a fastener there through. If bonded, the bonded joint can be a braze joint or a weld joint around the perimeter of the vane 42b at the interface with the annular support 473.

Figure 13A:
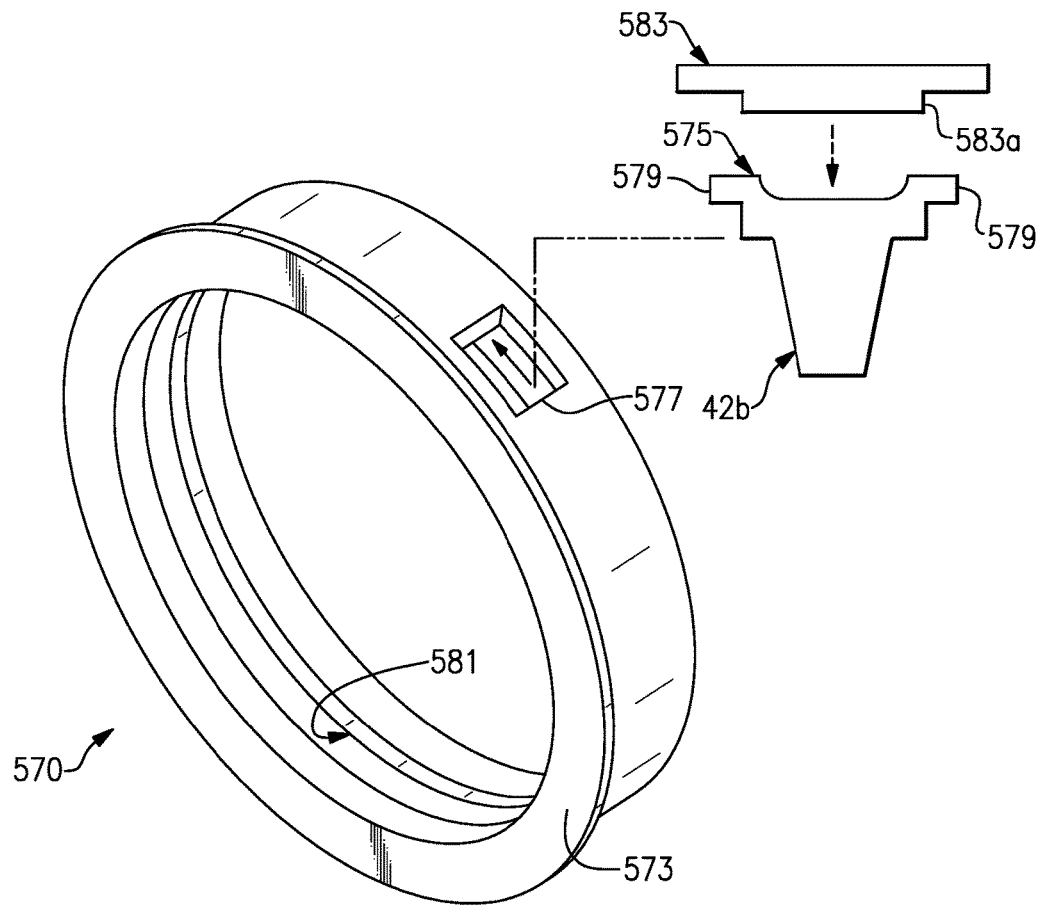
FIG. 13A illustrates another example continuous hoop vane ring.
Figure 13B:
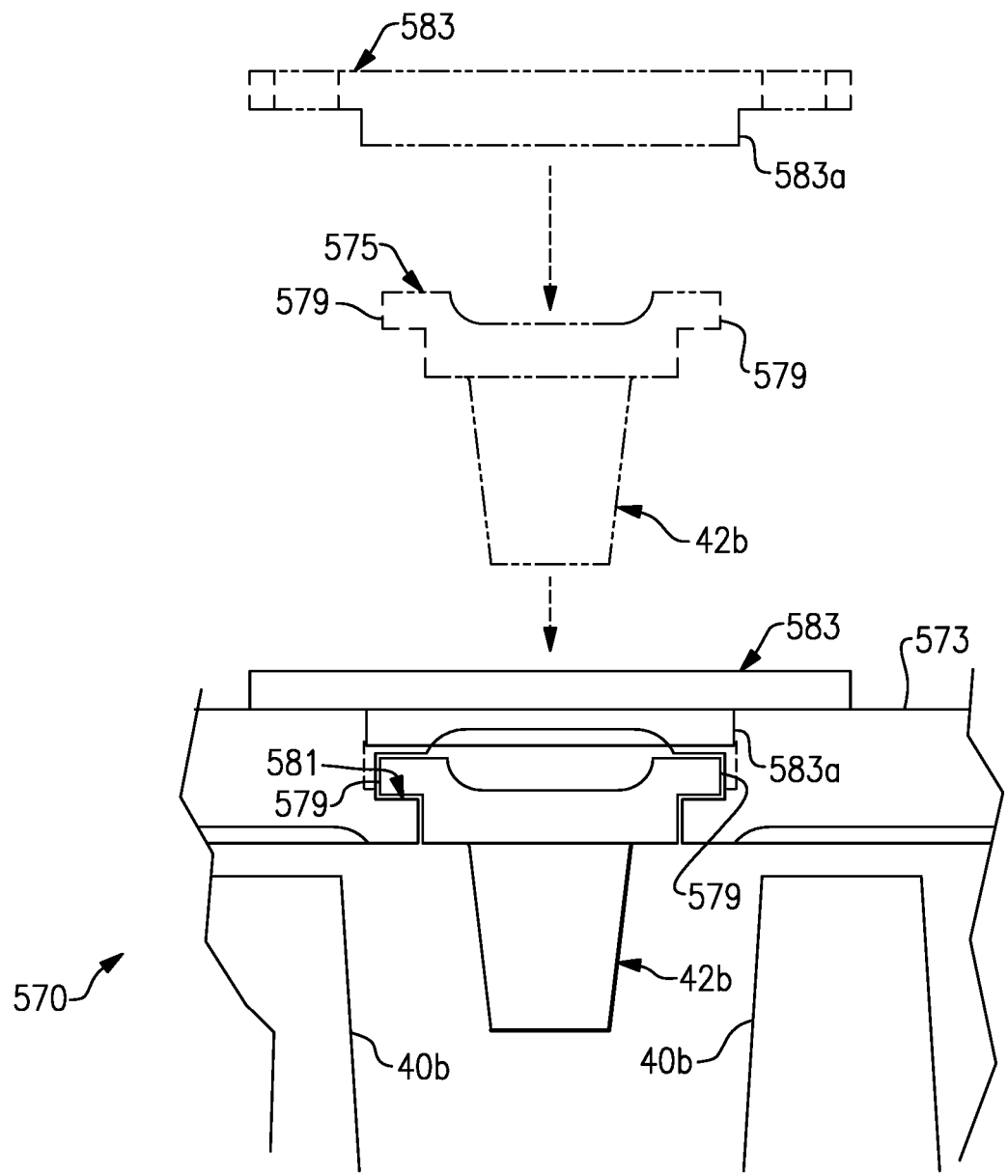
FIG. 13B illustrates a cross-section of the continuous hoop vane ring of FIG. 13A after insertion of a vane.

FIGS. 13A and 13B illustrate another example vane assembly 570 for installing the row of compressor vanes 42b axially between the rows of the compressor blades 40b of the multi-row integrally bladed rotor drum 60. In this example, the vane assembly 570 is a continuous full hoop that includes an annular support 573 with at least one window 577 that opens radially outwards. The annular support 573 can be positioned axially between the rows of rotor blades 40b, and the vanes 42b can then be inserted radially through the window 577.

The platforms 575 of the vanes 42b have opposed hooks 579 that engage a slot 581 at the inner diameter of the annular support 573. The slot 581 extends circumferentially around the inner diameter of the annular support 573. Each vane 42b is inserted through the window 577 and into the slot 581. The hooks 579 engage the slot 581 such that the vane 42b can then be slid circumferentially around the slot 581 to its final assembly position. After all of the vanes 42b have been inserted and slid to final position, a cover 583 is secured over the window 577. The cover 583 has a stop portion 583a that protrudes radially inwards in between adjacent vanes 42b. The stop 583a circumferentially locks the vanes 42b in place. Alternatively, the stop portion 583a can be a separate piece from the cover 583.

Figure 14:
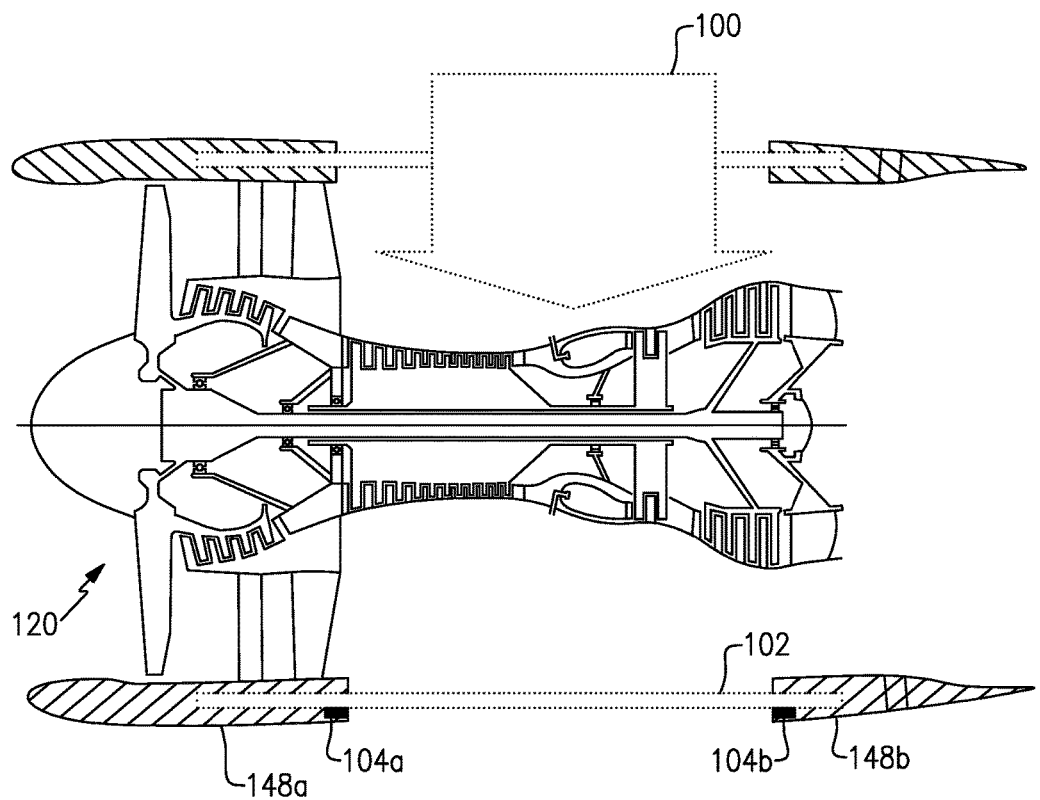
FIG. 14 illustrates an example of a gas turbine engine with a case that has a first section and a second, hoop section aft of the first section.

FIG. 14 illustrates another example gas turbine engine 120 that is similar to the engine 20. In this example, the case 148 is separable to permit a relatively large access work space 100 through the case 148 between an exterior of the case 148 and the core engine. The case 148 has a first section 148a and a second, hoop section 148b aft of the first section 148a. The second section 148b is axially moveable from the first section 148a to provide the access work space 100. In one example, the case 148 includes a track 102 on which the second section 148b is slidable. Lock members 104a/104b can be provided to selectively secure the first section 148a and the second section 148b together. For example, the lock members 104a/104b include a latch, a V-groove arrangement, or the like, which also ensure axial alignment of the sections 148a/148b.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method for assembling a section of a gas turbine engine, the method comprising:
    aligning variable vanes on a vane ring with a corresponding one of a plurality of throat regions of an end row of blades of a multi-row rotor drum; and
    moving the vane ring such that the variable vanes move through the plurality of throat regions past the end row into a position axially between the end row and a next row of blades of the multi-row rotor drum.

2. The method as recited in claim 1, wherein the multi-row rotor drum is formed of a single-piece body that has a plurality of rows of blades.

3. The method as recited in claim 1, wherein the aligning includes adjusting the variable vanes in unison.

4. The method as recited in claim 1, wherein the aligning includes adjusting the variable vanes individually.

5. The method as recited in claim 1, wherein the aligning includes adjusting the variable vanes using an assembly tool.

6. The method as recited in claim 1, including moving the vane ring axially and circumferentially to navigate the variable vanes through the throat regions free of contact with the blades of the end row.

7. The method as recited in claim 1, including pivoting the variable vanes to navigate the variable vanes through the throat regions free of contact with the blades of the end row.

* * * * *